United States Patent
Li

(10) Patent No.: US 10,333,809 B2
(45) Date of Patent: Jun. 25, 2019

(54) DYNAMIC SWITCHING BETWEEN EDGE NODES IN AUTONOMOUS NETWORK SYSTEM

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 94 days.

(21) Appl. No.: 15/230,806

(22) Filed: Aug. 8, 2016

(65) Prior Publication Data

US 2017/0366426 A1  Dec. 21, 2017

(30) Foreign Application Priority Data

Jun. 15, 2016 (CN) .......................... 2016 1 0423492

(51) Int. Cl.
*H04L 12/26* (2006.01)
*H04W 76/10* (2018.01)
*H04L 12/715* (2013.01)
*H04L 12/717* (2013.01)

(52) U.S. Cl.
CPC .............. *H04L 43/08* (2013.01); *H04L 43/16* (2013.01); *H04L 45/04* (2013.01); *H04L 45/42* (2013.01); *H04W 76/10* (2018.02)

(58) Field of Classification Search
CPC ......... H04L 43/08; H04L 43/16; H04W 76/10
See application file for complete search history.

(56) References Cited

U.S. PATENT DOCUMENTS

| | | | | |
|---|---|---|---|---|
| 7,139,278 | B2* | 11/2006 | Gibson | H04L 45/02 370/401 |
| 7,529,257 | B1* | 5/2009 | Tappan | H04L 45/00 370/409 |
| 7,573,826 | B1* | 8/2009 | Beshai | H04L 29/12009 370/241 |
| 7,849,215 | B2 | 12/2010 | Csaszar et al. | |
| 8,081,563 | B2* | 12/2011 | Guichard | H04L 1/22 370/217 |
| 8,289,845 | B1* | 10/2012 | Baldonado | H04L 43/50 370/229 |
| 8,355,316 | B1* | 1/2013 | Lushear | H04L 43/0817 370/217 |
| 8,401,028 | B2 | 3/2013 | Mihaly et al. | |
| 9,762,537 | B1* | 9/2017 | Eyada | H04L 63/0227 |

(Continued)

*Primary Examiner* — Khaled M Kassim

(57) ABSTRACT

System and method of dynamically selecting an egress edge node for data transmission between different autonomous systems based on real-time route performance detection. With respect to a destination node located in a second autonomous system, a plurality of edge nodes in the first autonomous system each operate to detect route performance in real-time and send the detected information to a control center for evaluation. The evaluation results are compared and used to select an optimal edge node and an associated link for transporting data between the source node and the destination node. To switch from a first edge node to a second one, the IP address of the source node contained in the data packets are converted from an address assigned to the first edge node to an address assigned to the second edge node.

13 Claims, 5 Drawing Sheets

(56) References Cited

U.S. PATENT DOCUMENTS

| | | | | |
|---|---|---|---|---|
| 2003/0026258 A1* | 2/2003 | Takatani | H04L 29/06 | 370/392 |
| 2003/0118036 A1* | 6/2003 | Gibson | H04L 45/02 | 370/401 |
| 2006/0256724 A1* | 11/2006 | Martini | H04L 45/04 | 370/238 |
| 2007/0171817 A1* | 7/2007 | Fujita | H04L 45/02 | 370/225 |
| 2008/0089227 A1* | 4/2008 | Guichard | H04L 1/22 | 370/228 |
| 2009/0245259 A1* | 10/2009 | Filsfils | H04L 45/02 | 370/392 |
| 2010/0077056 A1* | 3/2010 | Kokal | H04N 21/23106 | 709/217 |
| 2010/0177632 A1* | 7/2010 | Tarnanen | H04L 41/5009 | 370/225 |
| 2010/0189115 A1* | 7/2010 | Kitada | H04L 45/00 | 370/400 |
| 2011/0199891 A1* | 8/2011 | Chen | H04L 45/22 | 370/218 |
| 2013/0016605 A1* | 1/2013 | Chen | H04L 45/02 | 370/221 |
| 2013/0308468 A1* | 11/2013 | Cowie | H04L 43/04 | 370/248 |
| 2013/0339519 A1* | 12/2013 | Lientz | H04L 41/0896 | 709/224 |
| 2014/0254423 A1* | 9/2014 | Beesabathina | H04L 45/02 | 370/254 |
| 2014/0259109 A1* | 9/2014 | Houston | H04L 63/10 | 726/3 |
| 2014/0328158 A1* | 11/2014 | Shao | H04W 24/04 | 370/218 |
| 2015/0009803 A1* | 1/2015 | Bashandy | H04L 41/0668 | 370/219 |
| 2015/0043380 A1* | 2/2015 | Varga | H04L 45/68 | 370/254 |
| 2016/0234099 A1* | 8/2016 | Jiao | H04L 45/02 | |
| 2016/0261493 A1 | 9/2016 | Li | | |
| 2017/0019430 A1* | 1/2017 | Cohn | H04L 65/1036 | |
| 2017/0324622 A1* | 11/2017 | Ubaldi | H04L 41/12 | |

* cited by examiner

DYNAMIC SWITCHING BETWEEN EDGE NODES IN AUTONOMOUS NETWORK SYSTEM

CROSS REFERENCE

This Patent Application claims priority to and benefit of Chinese Patent Application No. 201610423492.4, filed on Jun. 15, 2016, the content of which is herein incorporated by reference in entirety for all purposes.

TECHNICAL FIELD

The present disclosure relates generally to the field of network traffic routing, and, more specifically, to the field of routing across multiple autonomous systems.

BACKGROUND OF THE INVENTION

An autonomous system refers to a network or a collection of networks that are administrated by a single entity or organization, e.g., an Internet service provider (ISP). Typically, an autonomous system is a heterogeneous network having many subnetworks with combined routing logic and common routing policies. An autonomous system usually uses multiple ingress and egress edge nodes to interface with other autonomous system. Outbound data traffic of the autonomous system goes through a designated egress edge node to reach the destination node in another autonomous system.

Border Gateway Protocol (BGP) is a standardized exterior gateway protocol designed to exchange routing and reachability information among autonomous systems on the Internet. The BGP is used to make routing decisions based on paths, network policies or rule-sets configured by a network administrator, and is involved in making core routing decisions. The BGP may also be used for routing within an autonomous system or across multiple autonomous systems.

Conventionally, an autonomous typically assigns a subnetwork or a set of associated network addresses to a specific edge node and broadcasts the assignment to all the coupled external autonomous systems according to the BGP. The assignment may result from a routing optimization process. Thus, for a particular source node in the autonomous system and a destination node in another autonomous system, the data transmission is routed through an assigned edge node.

Usually, the information of one autonomous system that is needed for routing determination is not readily available to another autonomous system, including a reassignment of the egress edge nodes. If the autonomous system switches to using another egress edge node for a particular subnetwork to improve network performance, the change has to be communicated to another autonomous system through broadcast again. Otherwise, inbound data traffic from another autonomous system still goes through the originally assigned edge node to reach the particular subnetwork. This makes the change of edge node ineffective in terms of network performance improvement.

Broadcasting an edge node selection in an autonomous system is usually directed to all the external autonomous systems. Frequent broadcasting is undesirable as it contributes to network traffic congestion. In addition, network performance is usually specific to a particular external autonomous system or a particular link. However, broadcasting the reassignment of the involved subnetwork to another edge node causes a substantial amount traffic that is unrelated to the particular external antonymous system or link to migrate to the selected edge node as well. Inevitably, this further counteracts the overall effect in network performance improvement.

SUMMARY OF THE INVENTION

Therefore, it would be advantageous to provide a mechanism of intelligently allocating edge nodes in an autonomous system that can dynamically enhance network performance of the autonomous system and yet offer flexibility in controlling traffic migration among the edge nodes.

Provided herein are systems and methods of dynamically selecting an edge node in a first autonomous system based on real-time network performance of data transmission directed to a destination node in a second autonomous system. Responsive to an initial request within the first autonomous system for visiting the destination node, a first edge node may be used for routing based on a default assignment which appoints a group of IP addresses to a respective edge node in the first autonomous system. The assignment may have been broadcast to the external autonomous systems coupled to the first autonomous system. During the data transmission, a plurality of edge nodes of the first autonomous system operate to detect network performance information related to traffic between respective edge nodes and the destination node. The detected information is supplied from each edge node to a control center of the first autonomous system for evaluation. Accordingly, the control center may select another edge node (a second edge node) based on quality of service (QoS) and/or other constraints for routing data to the destination node.

Once being selected to take over the data transmission, the second edge node performs network address translation on the data packets sent from the source node. Thereby, the Internet Protocol (IP) address of the source node is converted from a first address associated with the first edge node to a second address associated with the second edge node. In this manner, when the destination node receives the data packets, it perceives the second address as the IP address of the source node, and therefore sends data packets back to the source node through the second edge node and according to the default assignment that it has previously received through broadcast.

According to the present disclosure, an edge node can be dynamically selected based on real-time network performance, which can advantageously and consistently ensure quality of service by taking into account the current conditions and statuses of the related network elements and links. Because the network performance is evaluated with respect to specific selected destination nodes, an autonomous system has the flexibility to improve the network performance with intended granularity. Through real-time detection at the edge nodes, even in the scenarios that the topology information of the second autonomous system remains inaccessible to the first autonomous system, an edge node and a data route offering superior performance for one or more particular destination nodes can be effectively determined.

Moreover, the edge node switching is enabled by network address translation which can be advantageously performed transparent to the external autonomous systems. This effectively ensures the two-way data traffic between the source and the destination nodes to be routed through the second edge node while without broadcasting. This advantageously avoids the potential adverse effect from the conventional broadcasting, such as traffic congestion. Also, as the edge node switching is specific to the data traffic related to the destination node in the second autonomous system, it does not affect traffic between the first autonomous system and other external autonomous systems.

According to one embodiment, a computer implemented method of data routing across different autonomous systems includes routing data between a source node in a first autonomous system and a destination node in a second autonomous system via a first edge node in the first autonomous system. During the routing, network performance of a plurality of edge nodes in the first autonomous system is evaluated with respect to the destination node. A second edge node is selected from the plurality of edge nodes based on the evaluating. Based on the selecting, an indication is generated for switching from the first edge node to the second edge node for routing the data.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
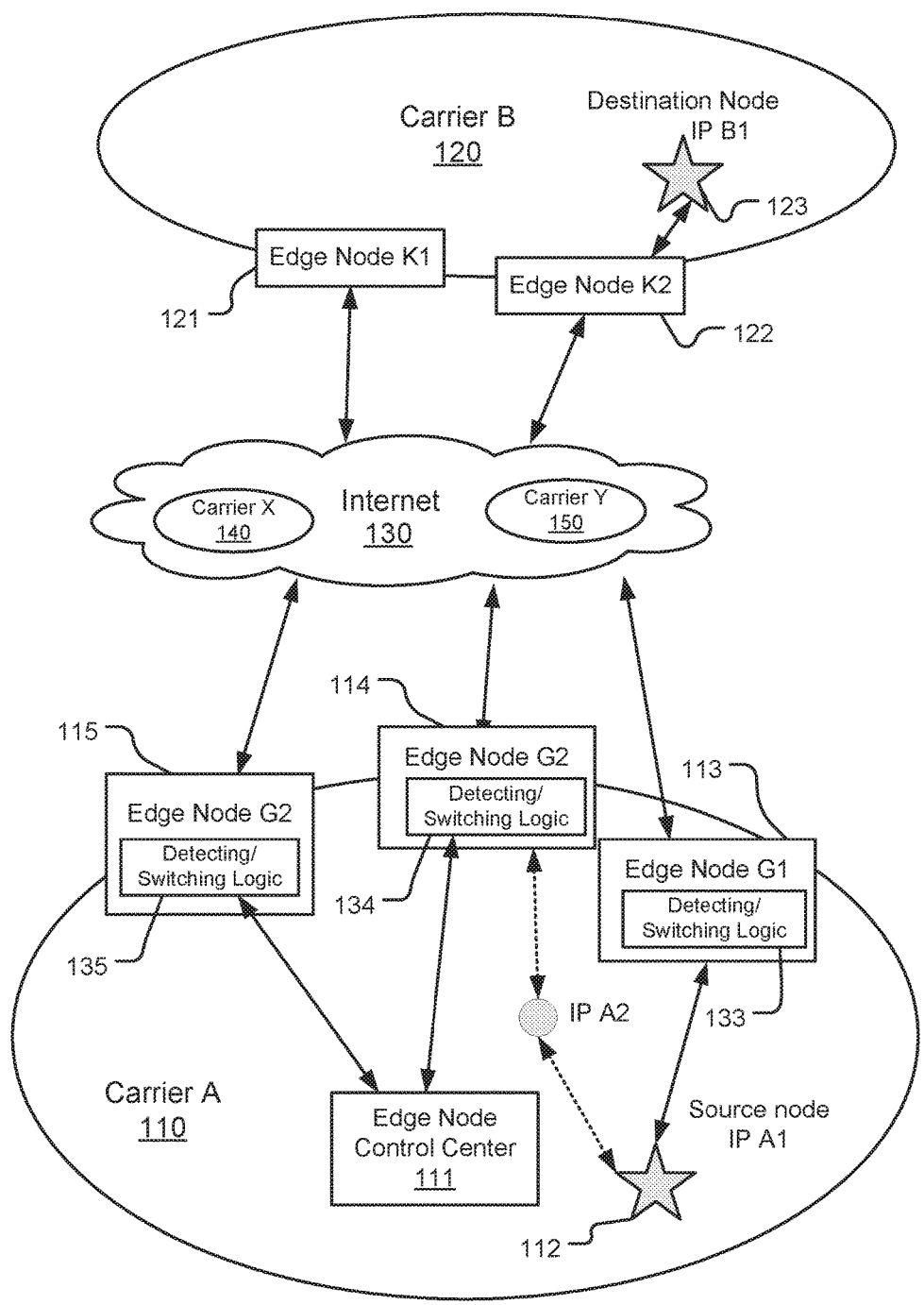
FIG. 1 illustrates an exemplary communication system in which data traffic can be routed across two autonomous systems in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Dynamic Switching Between Edge in Autonomous Network System

Embodiments of the present disclosure provide a mechanism for dynamically selecting an edge node in an autonomous system based on real-time route performance detection. With respect to a destination node located in a second autonomous system, a plurality of edge nodes in a first autonomous system each operate to detect route performance in real-time and send the detected information to a control center for evaluation. The evaluation results are compared and used to select an optimal edge node and an associated link for transporting data between the source node and the destination node. Network address translation is used for switching from a first edge node to a second one. More specifically, the IP address of the source node contained in a data packet is converted from an address assigned to the first edge node to an address assigned to the second edge node.

FIG. 1 illustrates an exemplary communication system 100 in which data traffic can be routed across two autonomous systems 110 and 120 in accordance with an embodiment of the present disclosure. Each autonomous system includes network elements within a defined domain that a particular entity owns, operates or manages, such as an Internet service provider (ISP) or a so-called "carrier." In this example, the autonomous systems 110 and 120 correspond to networks of Carrier A and Carrier B and are coupled with a core network 130. The core network 130 may be a public access network such as the Internet (as shown), a physically separate intranet, or other interconnection. The core network 130 may include other autonomous systems, e.g., Carrier X 140 and Y 150 as illustrated.

Carrier A 110 includes edge nodes G1-G3 113-115 coupled to and an edge node control center 111 responsible to control switching among the edge nodes 113-115. A source node 112 having the IP address of "IP A1" is located in the first autonomous system. A destination node 123 having the IP address of "IP B1" is located in the second autonomous system 120 which includes the edge nodes K1 121 and K2 122. The source node 112 and the destination node 123 can be resident on any type of device in a network, e.g., a user device, a server device, and etc.

In some embodiments, Carrier A 110 can pre-allocate a group of IP addresses with its domain to a respective edge node and communicates the allocation to the external carriers 120, 140 and 150 by virtue of broadcasting in accordance with the Border Gateway Protocol (BPG). In this example, assuming that IP A1 is pre-allocated to the edge node G1 113, the data transmission between the source node 112 and the destination node 123 is initially routed through the edge node G1 113 by default.

According to the present disclosure each of a plurality of edge nodes G1-G3 113-115 is equipped with detecting/switching logic 133-135 to collect real-time performance data with regards to one or more routes linking the edge node 113 to the destination node 123. The detected performance data is submitted to the control center 111 for evaluation and comparison based on a routing optimization mechanism. For example, the evaluation includes computing a set of evaluation metrics according to predetermined quality of service policies. In some embodiments, the evaluation is triggered by a determination that the current network performance has deteriorated.

The control center 111 may maintain a database including the information related to a set of destination nodes in the external carriers including the destination node 123, the edge nodes in Carrier A and relevant network performance data. The information is dynamically updated with performance data collected from the edge nodes G1-G3 113-115.

Based on the database, the control center 111 makes a routing decision which identifies an optimal edge node and an associated route for routing subsequent data traffic between the selected egress node and the destination node 126. In this example, the control center 111 determines that the edge node G2 114 would outperform the current edge node G1 113 for data transmission to the destination node 126. The control center 111 then generates a switching instruction for Carrier A 110 to switch to using G2 114 for routing the data.

It will be appreciated that a link within Carrier A 110 between the source node 112 and the selected egress edge node may also be determined according to a route optimization process to accomplish optimized end-to-end data transmission. As a result, a data transmission route can be established between the source node and the destination node by way of the selected egress edge node in Carrier A 110, the Internet 130, and the destination node 126 in Carrier B 120. However, in some embodiments, more than one egress edge node of the Carrier A 110 may be selected for transmitting data in the fashion of load sharing and balancing.

As a result, an edge node can be dynamically selected based on real-time network performance, which can advantageously and consistently ensure quality of service by taking into account the current conditions and statuses of the related network elements and links. This also offers flexibility of an autonomous system to control the quality of service with intended granularity as the network performance is evaluated with respect to one or more specific destination nodes. Through real-time detection at the edge nodes, even in the scenarios that the topology information of the second autonomous system remains inaccessible to the first autonomous system, an edge node and a data route offering superior performance for one or more particular destination nodes can be effectively determined.

According to the present disclosure, re-allocating an edge node is enabled by virtue of network address translation performed by the switching logic in an edge node. More specifically, Responsive to a switching instruction from the control center 111 or the original edge node G1 113, the edge node G2 114 modifies the IP address of the source node 116 contained in the data packets from IP A1 to IP A2. As IP A2 has been pre-allocated to the edge node G2 114 and the pre-allocation has been broadcast to the Carrier B 120, the destination node receiving the data packets perceives that the source node 112 has the IP address of IP A2. Accordingly, the data packets sent from the destination node is no longer routed through G1 113, but through G2 114, to reach the source node 112.

As the edge node switching is enabled by network address translation, it can be performed transparent to the external autonomous systems and does not involve broadcasting as used in the conventional art. This effectively ensures the two-way data traffic between the source and the destination nodes to be routed through the second edge node without broadcasting. Thus, the potential adverse effect from conventional broadcasting can be advantageously avoided, such as traffic congestion.

Also, as the edge node switching is specific to the data traffic related to the destination node in Carrier B 120, it does not affect the traffic between the Carrier A and other external carriers Carrier X 140 and Y 150 and etc.

It will be appreciated that the internal route between the source node 112 and a selected egress edge node (e.g., the node 114) can be determined in any suitable manner that is well known in the art, e.g., based on real-time performance data and evaluating the collected performance data with regards to one or more routes directing to the sleeted edge node. It will be appreciated that the evaluation process with regard to the internal route may use the same or different criteria or metrics as used by an edge node as described above. Based on the collected data and evaluation results, a routing decision regarding data transmission within Carrier A 110 can be made by the control center 111, the edge node 114, or any other suitable network element. In this manner, the entire source-to-destination transmission route can be advantageously determined based on the real-time network performance.

Figure 2:
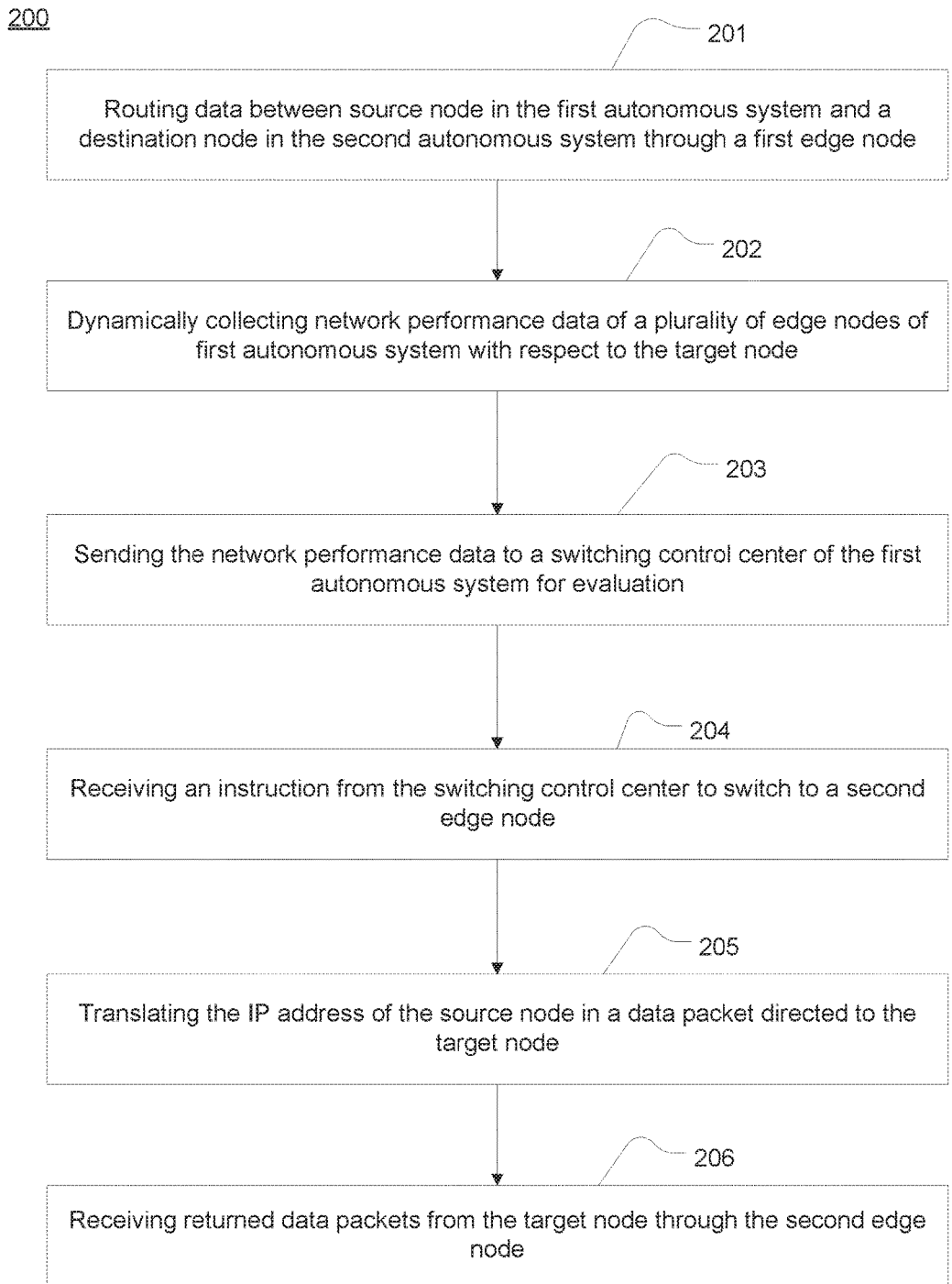
FIG. 2 is a flow chart depicting an exemplary computer implemented process of routing data through a dynamically selected edge node for data transmission between autonomous systems according to an embodiment of the present disclosure.

FIG. 2 is a flow chart depicting an exemplary computer implemented process 200 of routing data through a dynamically selected edge node for data transmission between autonomous systems according to an embodiment of the present disclosure. Process 200 may be implemented by the edge nodes in Carrier A in FIG. 1 for example, where data is to be routed between a source node in a first autonomous system to a destination node in a second autonomous system. The first and second autonomous system may communicate with each other using BPG. The first autonomous system includes a control center and a plurality of edge nodes each pre-allocated to a subnetwork or a group of IP addresses of the first autonomous system. In this example, the IP address IP A1 is pre-allocated with the first edge node and the IP address IP A2 is pre-allocated with the second edge node. The pre-allocation can be informed to the external autonomous systems by way of broadcasting.

At 201, a request is generated at the source node for visiting the destination node. The IP address of the source node is extracted from the request. Based on the IP address IP A1, the first edge node is identified. Data is routed between the source node and the destination node through the first edge node.

At 202, a route detection request may be broadcast to a plurality of edge nodes that are eligible as egress nodes for the first autonomous system. In response, each of the plurality of edge nodes detects performance data with respect to the candidate links between the edge node and the destination node. At 203, each edge nodes sends the detected performance data to the control center for performance evaluation according to predetermined evaluation criteria. In some embodiments, the evaluation is triggered by a determination that the network performance of the first edge node with respect to the destination node has becomes satisfactory. However the present disclosure is not limited to any specific event that triggers the evaluation.

In some embodiments, performance detection, evaluation and dynamic switching are limited to preselected destination nodes and/or source nodes, for example that have higher demands in quality of service. However, the present disclosure is not limited to such applications.

As will be appreciated by those skilled in the art, the present disclosure is not limited to any specific mechanism of attaining route performance data at an edge node of an autonomous system, either egress or ingress. In some embodiments, an edge node is configured to generate test packets (e.g., in compliance with the Border Gateway Protocol (BGP)) and send them to the candidate routes directing to the destination node. Based on the route behaviors responsive to the test packets, the edge node derives performance information regarding the links between the edge node and the destination along the routes. The performance information may be related to quality of service policies regarding availability, throughput, bandwidth utilization, speed, stability, packet loss, round trip time (RTT), reliability, unreachable time, latency, error rates, CPU and/or memory utilization and associated latency, etc.

At 204, if the evaluation result provides that a second edge node offers an optimal network performance, an instruction generated from the control center is received at the second edge node to take over the data transmission from the first edge node. At 205, in response to the instruction and upon receiving the data packets from the source node, the second edge node modifies the packets by converting the source node's IP address from IP A1 to IP A2 (as illustrated in FIG. 1). The conversion may be performed in accordance with network address translation (NAT) as defined in the BGP or any other suitable manner that is well known in the art. Thus, at 206, when the destination node receives the data packets, it routes data back through the second edge node which is pre-allocated to IP A2. Despite the network address translation, the returned data is delivered to the source node based on its original IP address, namely IP A1. During data transmission through a selected select edge node, the foregoing process of performance detection, evaluation, and dynamically switching to another edge node is repeated.

Figure 3:
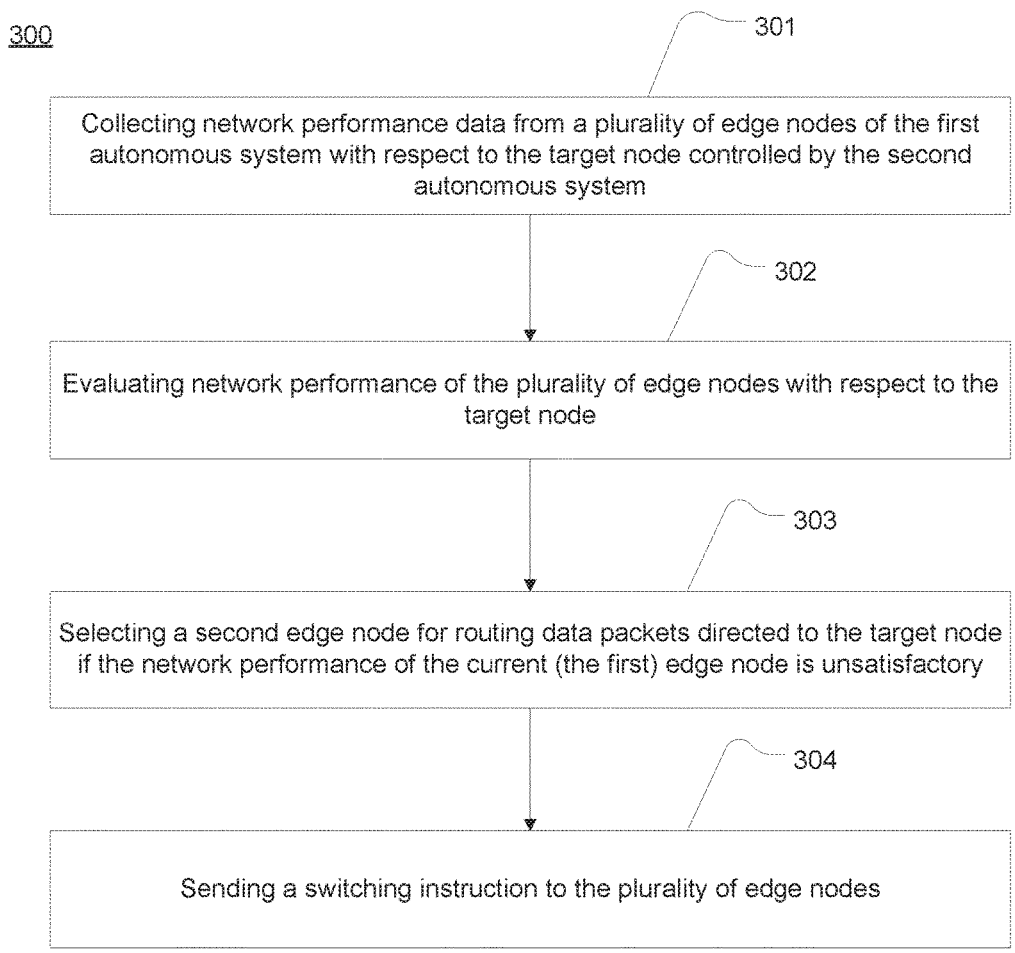
FIG. 3 is a flow chart depicting an exemplary process of dynamically selecting an edge node for data transmission between autonomous systems according to an embodiment of the present disclosure.

FIG. 3 is a flow chart depicting an exemplary process of dynamically selecting an edge node for data transmission between autonomous systems according to an embodiment of the present disclosure. Process 300 may be implemented by a control center in Carrier A as shown in FIG. 1 for example, where data is routed between a source node in a first autonomous system to a destination node in a second autonomous system. At 301, the network performance data is collected from a plurality of edge nodes of the first autonomous system, the performance data related to a destination node in a second autonomous system At 302, while data is routed between the source node and the destination node via the first edge node in the first autonomous system, the control center applies policy or other constraints to the network performance data to evaluate current route performance. At 303, if the network performance of the current route that includes the first edge node drops below a threshold, the control center selects a second edge node and the associated link directing to the destination based on the evaluation. At 304, the control center generates a switching instruction to the first edge node and the second edge node for switching to using the second edge node.

It will be appreciated by those skilled in the art that the present disclosure is not limited to any specific type or architecture of the network which includes the mechanism for discovering a route across different autonomous systems. The involved autonomous systems may be deployed on a wireless local area network (WLAN), a local area network (LAN), a wide area network (WAN), and etc. The autonomous systems according to the present disclosure may include a virtual network, a software-defined network (overlaying on physical network or natively as the primary network), a physical network only, or a combination thereof. For an autonomous system deployed on a virtual network, and typically a virtual private network, the edge nodes may correspond to gateway nodes, virtual routers or any other suitable network elements. For an autonomous system deployed on an SDN, the edge nodes may correspond to SDN points-of-presence (POPs) or any other suitable network elements. For an autonomous system exclusively deployed on a physical network, the edge nodes may correspond to proxy servers or any other suitable network element.

Figure 4:
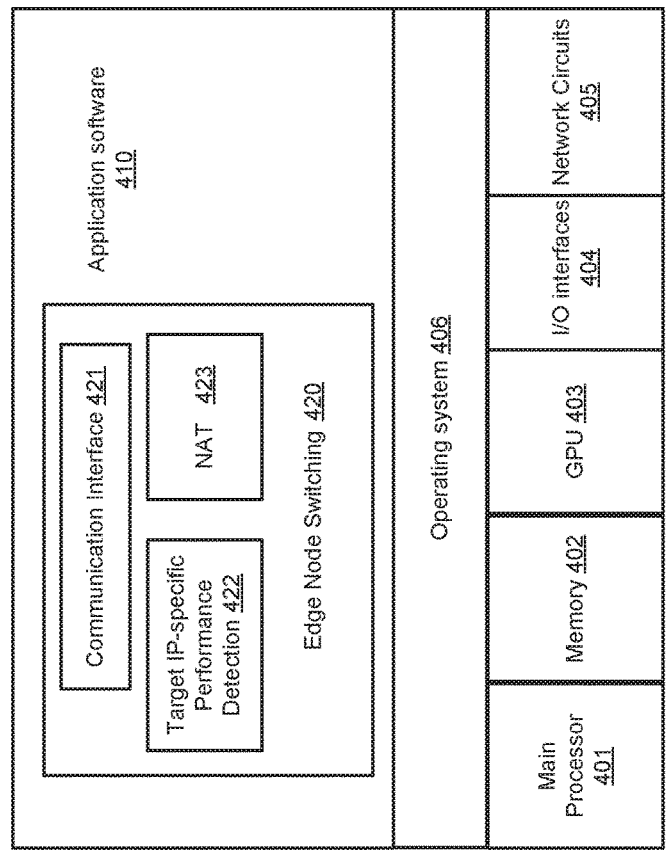
FIG. 4 is a block diagram illustrating the configuration of an exemplary edge node device configured to route data across multiple autonomous systems according to an embodiment of the present disclosure.

FIG. 4 is a block diagram illustrating the configuration of an exemplary edge node device 400 in an autonomous system configured to route data across multiple autonomous systems according to an embodiment of the present disclosure. The edge node device 400 may be a gateway in a first autonomous system implemented on a general-purpose server computer with software and/or hardware logic configured to perform the functions as described in greater detail with reference to FIGS. 1 and 2.

The edge node device 400 includes a main processor 401, system memory 402, a graphics processing unit (GPU) 403, I/O interfaces 404 and network circuits 405, an operating system 406 and application software 410. The application software 410 includes an edge node switching program 420 stored in the memory 402. When executed by the main processor 401, the edge node switching program 420 can communicate with a control center and the other edge nodes in first autonomous system and control the data flow from the first autonomous system to a second autonomous system.

More specifically, the edge node switching program 420 program includes a communication module 421, a detection module 422, and an NAT module 425. The communication module 421 is configured to receive instructions from the control center, generate and receive instructions from another edge node device with respect to selection and switching of edge node. It also serves to send the network performance data to the control center.

The detection module 422 is configured to detect real-time performance data with respect to one or more selected target IP addresses. The detection may be performed on-demand or periodically in different embodiments. In some embodiments, the detection module 422 includes BGP logic for collecting path information as defined in the BGP. For example, the BGP logic is used to detect the hop count of a path between the present edge node and a destination node.

In some embodiment, the detection module 422 can generate test packets (e.g., in compliance with the BGP) and send them to the candidate routes directing to a destination node. Based on the route behavior responsive to the test packets, the detection module 422 can derive performance information regarding the routes between the edge node and the destination node. In some embodiments, the performance information may be related to one or more attributes selected from availability, throughput, bandwidth utilization, speed, stability, packet loss, RTT, reliability, unreachable time, latency, error rates, CPU and memory utilization and associated latency. The present disclosure is not limited by the mechanism of detecting network performance. Nor is it limited by the performance information that can be detected by an edge node and used for edge node switching determinations.

The NAT module 423 performs network address translation based on pre-allocation of a set of IP-addresses versus the plurality of edge nodes in the first autonomous system. When the control center decides to switch from a first edge node to the present edge node 400, the NAT module 423 modifies the data packets sent from the source node to translate its IP address from one that is pre-allocated to the first edge node to another that is pre-allocated to the second edge node, as described in greater detail above.

Figure 5:
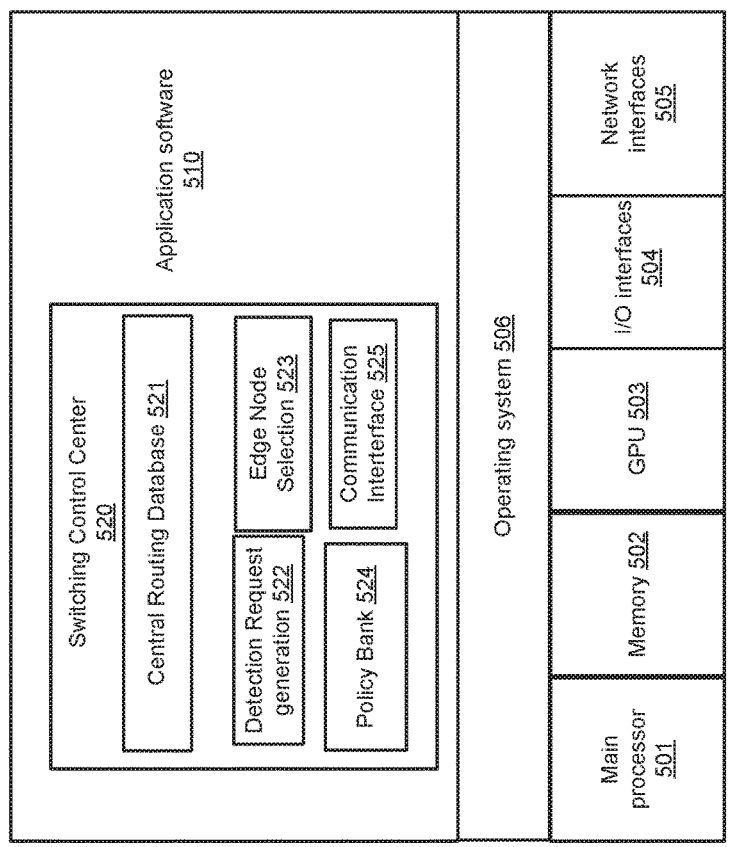
FIG. 5 is a block diagram illustrating the configuration of an exemplary control center device in a first autonomous system capable of dynamically selecting an optimal edge node for routing data across a second autonomous system based on real-time link performance data according to an embodiment of the present disclosure.

FIG. 5 is a block diagram illustrating the configuration of an exemplary control center device 500 in a first autonomous system capable of dynamically selecting an optimal edge node for routing data across a second autonomous system based on real-time link performance data according to an embodiment of the present disclosure. The device 500 may be a general-purpose server computer. The control center 500 includes a main processor 501, system memory 502, a GPU 503, I/O interfaces 504 and network circuits 505, an operating system 506 and application software 510. The application software 510 includes a switching control center program 520 stored in the memory 502. When executed by the main processor 501, the switching control center program 520 can communicate with a plurality of edge nodes and coordinate them to control the data flow from a first autonomous system to a second autonomous system.

More specifically, the switching control center program 520 program includes a central routing database 521 of the first autonomous system, a detection request generation 522 module, an edge node selection module 523, a policy bank 524, and communication module 525. The central routing database 521 maintains the information regarding the arrangement and statuses of various components and the physical and logical structure of the first autonomous system as well as the dynamic link performance information provided from the plurality of edge nodes.

The detection request generation module 522 generates a route detection request, e.g., each time a data packet is to be routed to a selected destination node. Based on the information contained in the database 521 and the applicable policy constraints stored in the policy bank 524, the edge node selection module 523 applies the set of policy constraints on the detected performance data according to a route optimization process to make an edge node selection decision. For example, the edge node selection module 523 can compare the evaluation results that are provided from the plurality of edge nodes to make the selection. The decision identifies a selected egress edge node and the selected link directing to the destination node in another autonomous system. The decision may also identify a link within the first autonomous system between an ingress node and the select egress edge node. Accordingly, the communication module 525 generates a switching instruction and sends it to the selected edge node. The switching control center program 520 may perform other various functions and processes as discussed in detail with reference to FIGS. 1-3.

It will be appreciated that the edge node switching program 400 and the switching control center program 500 may include a wide range of other modules and functions that are well known in the art. Techniques for implementing these programmed modules are well known in the art. As will be appreciated by those with ordinary skill in the art, the control center program 420 can be implemented in any one or more suitable programming languages that are known to those skilled in the art, such as C, C++, Java, Python, Perl, C#, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of data routing across different autonomous systems, said method comprising:
   from a first autonomous system, broadcasting, to a plurality of autonomous systems comprising a second autonomous system, a pre-allocation of default edge nodes, wherein said pre-allocation indicates that:
      a first edge node is pre-allocated as a default node for a first group of network addresses associated with said first autonomous system; and
      a second edge node is pre-allocated as a default node for a second group of network addresses associated with said first autonomous system; and
   during routing data between a source node in a first autonomous system and a destination node in a second autonomous system via said first edge node, evaluating real-time network performance between a plurality of edge nodes in said first autonomous system and said destination node, wherein said source node is associated with a first network address comprised in said first group of network addresses;
   selecting said second edge node from said plurality of edge nodes based on said evaluating; and
   based on said selecting, switching from said first edge node to said second edge node for routing said, wherein said switching comprises performing network address translation on data packets sent from said source node, wherein said performing said network address translation comprises converting said first network address contained in said data packets to a second network address that is comprised in said second group of network addresses.

2. The computer implemented method of claim 1, wherein, without said switching being broadcast to said second autonomous system, said network address translation causes data transmitted from said destination node to said source data to be routed via said second edge node.

3. The computer implemented method of claim 1, wherein said broadcasting is performed in compliance with a Border Gateway Protocol (BGP).

4. The computer implemented method of claim 1, wherein said first autonomous system comprises a physical network controlled by a first Internet Service Provider (ISP),
wherein said second autonomous system is controlled by a second ISP , and
wherein further a respective edge node corresponds to a gateway of said first autonomous system.

5. The computer implemented method of claim 1, wherein said evaluating said real-time network performance is based on information detected by said plurality of edge nodes, and wherein said plurality of edge nodes comprise said first edge node; and
wherein said plurality of edge nodes corresponds to egress edge nodes of said first autonomous system.

6. The computer implemented method of claim 5, wherein information detected by said plurality of edge nodes is obtained by sending test packets from said plurality of edge nodes to said destination node.

7. A system controlled by a first autonomous system, said system comprising:
a processor;
network circuits coupled to said processor; and
memory coupled to said processor and storing instructions that, when executed by said processor, cause the system to perform a method of facilitating data routing across multiple autonomous systems, said method comprising:
from a first autonomous system, broadcasting, to a plurality of autonomous systems comprising a second autonomous system, a pre-allocation of default edge nodes, wherein said pre-allocation indicates that:
a first edge node is pre-allocated as a default node for a first group of network addresses associated with said first autonomous system; and
a second edge node is pre-allocated as a default node for a second group of network addresses associated with said first autonomous system; and
during routing data between a source node in said first autonomous system and a destination node in said second autonomous system via a first edge node in said first autonomous system, evaluating real-time network performance between a plurality of edge nodes in said first autonomous system and said destination node;
selecting said second edge node from said plurality of edge nodes based on said evaluating with respect to said destination node; and
based on said selecting, switching from said first edge node to said second edge node for routing said data to said destination node, wherein said switching comprises performing network address translation on data packets sent from said source node, wherein said performing said network address translation comprises converting said first network address contained in said data packets to a second network address that is comprised in said second group of network addresses.

8. The system of claim 7, wherein said network address translation is operable to cause data transmitted from said destination node to said source data to be routed via said second edge node.

9. The system of claim 7,
wherein said broadcasting is in compliance with a Border Gateway Protocol (BGP).

10. The system of claim 8, wherein said switching from said first edge node to said second edge node is performed without broadcasting to said plurality of edge nodes.

11. The system of claim 7, wherein said evaluating is performed according to a routing optimization process, and wherein said plurality of edge nodes corresponds to egress edge nodes of said first autonomous system.

12. The system of claim 7, wherein said evaluating said network performance is based on information transmitted from said plurality of edge nodes and according to predetermined criteria.

13. The computer implemented method of claim 12, wherein information is detected by said plurality of edge nodes sending teAst packets to said destination node.

* * * * *